(12) United States Patent
Wang et al.

(10) Patent No.: US 10,867,243 B2
(45) Date of Patent: Dec. 15, 2020

(54) RECOGNITION APPARATUS BASED ON DEEP NEURAL NETWORK, TRAINING APPARATUS AND METHODS THEREOF

(71) Applicant: Fujitsu Limited, Kawasaki (JP)

(72) Inventors: Song Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 874 days.

(21) Appl. No.: 15/587,803

(22) Filed: May 5, 2017

(65) Prior Publication Data
US 2017/0323202 A1    Nov. 9, 2017

(30) Foreign Application Priority Data
May 6, 2016 (CN) .......................... 2016 1 0298158

(51) Int. Cl.
*G06N 3/08* (2006.01)
*G06N 3/04* (2006.01)

(52) U.S. Cl.
CPC ................. *G06N 3/08* (2013.01); *G06N 3/04* (2013.01); *G06N 3/084* (2013.01); *G06N 3/0454* (2013.01)

(58) Field of Classification Search
CPC ............ G06N 3/08; G06N 3/084; G06N 3/04; G06N 3/0454; G06N 3/0481
See application file for complete search history.

(56) References Cited

U.S. PATENT DOCUMENTS

| 5,903,884 A * | 5/1999 | Lyon ................... G06K 9/6255 382/155 |
| 10,579,923 B2 * | 3/2020 | Munawar ............... G06N 3/084 |
| 2005/0149463 A1 | 7/2005 | Bolt et al. |
| 2016/0092766 A1 | 3/2016 | Sainath et al. |

FOREIGN PATENT DOCUMENTS

| CN | 102521656 | 6/2012 |
| CN | 104102919 | 10/2014 |
| CN | 105354568 | 2/2016 |

OTHER PUBLICATIONS

Korean Office Action dated May 30, 2019 in corresponding Korean Patent Application No. 10-2017-0054482 (3 pages).
Chinese Office Action dated Aug. 21, 2019 in corresponding Chinese Patent Application No. 201610298158.0.

(Continued)

*Primary Examiner* — Alexey Shmatov
*Assistant Examiner* — Hansol Doh
(74) *Attorney, Agent, or Firm* — Staas & Halsey LLP

(57) ABSTRACT

A recognition apparatus based on a deep neural network, a training apparatus and methods thereof. The deep neural network is obtained by inputting training samples comprising positive samples and negative samples into an input layer of the deep neural network and training. The apparatus includes: a judging unit configured to judge that a sample to be recognized is a suspected abnormal sample when confidences of positive sample classes in a classification result outputted by an output layer of the deep neural network are all less than a predefined threshold value. Hence, reliability of a confidence of a classification result outputted by the deep neural network may be efficiently improved.

2 Claims, 7 Drawing Sheets

(56) References Cited

OTHER PUBLICATIONS

"Analysis and studies based on error-back-propagation neural network algorithm", Journal of Puyang Vocational and Technical College, vol. 23, No. 1, Feb. 2010, 4 pages.
Korean Office Action dated Oct. 31, 2018 from Korean Patent Application No. 10-2017-0054482, 12 pages.
Extended European Search Report dated Sep. 28, 2017 in European Patent Application No. 17168391.5.
Yadav Balvant et al, "Novelty detection applied to the classification problem using Probabilistic Neural Network", 2014 IEEE Symposium on Computational Intelligence and Data Mining (CIDM), IEEE, 265-272, XP032720656.
Chinese Office Action dated May 9, 2020 for counterpart Chinese patent application No. 201610298158.0.

* cited by examiner

RECOGNITION APPARATUS BASED ON DEEP NEURAL NETWORK, TRAINING APPARATUS AND METHODS THEREOF

CROSS-REFERENCE TO RELATED APPLICATIONS

This application claims the benefit of Chinese Application No. 201610298158.0, filed May 6, 2016, in the Chinese Intellectual Property Office, the disclosure of which is incorporated herein by reference.

BACKGROUND

1. Field

This disclosure relates to the field of information technology, and in particular to a recognition apparatus based on a deep neural network, a training apparatus and methods thereof.

2. Description of the Related Art

Nowadays, as continuous development of information technologies, recognition methods based on a deep neural network (DNN) have succeeded in the field of classification. An existing DNN is a hierarchical model. FIG. 1 is a schematic diagram of an existing DNN. As shown in FIG. 1, the existing DNN consists of an input layer 101, several hidden layers 102 and an output layer 103. The input layer 101 generally be input to-be-processed data; the hidden layers 102 may include a convolutional layer, a pooling layer, or an fully connected layer, etc.; and for an issue of classification, the output layer 103 may be a classifier, such as a softmax classifier, or a support vector machine (SVM), etc.

The existing DNN usually takes minimization of network loss (also referred to a classification error) as an optimization target in training, with an optimization method being a backward propagation algorithm. FIG. 2 is a schematic diagram of training a DNN by using an existing method. As shown in FIG. 2, first, training samples are inputted into the input layer 101, with information being forward propagated along the DNN, then it is propagated to the output layer 103 via the hidden layers 102, and a classification result outputted by the output layer 103 is compared with a real value of a class of the training sample to obtain the network loss; thereafter, the network loss is transmitted back layer by layer, thereby correcting parameters of each of the output layer 103, the hidden layers 102 and the input layer 101. The above steps are repeated, until the network loss satisfies a specific convergence condition, and it is deemed that the optimization target of the DNN is achieved, and the training is ended.

FIG. 3 is a schematic diagram of performing recognition by using a DNN trained by using an existing training method. As show in FIG. 3, when an inputted to-be-recognized sample is an abnormal sample (such as a negative sample), confidences of outputted positive sample classes are 3%, 7%, and 90%, respectively.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the embodiments.

When a DNN trained by using an existing training method is used to recognize, in a case where an input to-be-recognized sample is an abnormal sample, a confidence (such as 90% in FIG. 3) of a positive sample class in an output classification result is still very high, thereby resulting in the classification result being unreliable.

Embodiments of this disclosure provide a recognition apparatus based on a deep neural network, a training apparatus and methods thereof, in which by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

According to a first aspect of the embodiments of this disclosure, there is provided a recognition apparatus based on a deep neural network, the deep neural network being obtained by inputting training samples including positive samples and negative samples into an input layer of the deep neural network and training, the apparatus including: a judging unit configured to judge that a sample to be recognized is a suspected abnormal sample when confidences of positive sample classes in a classification result outputted by an output layer of the deep neural network are all less than a predefined threshold value.

According to a second aspect of the embodiments of this disclosure, there is provided a training apparatus for a deep neural network, including: an inputting unit configured to input training samples including positive samples and negative samples into an input layer of the deep neural network; a setting unit configured to, for the positive samples in the training samples, set real-value tags of positive sample classes of the positive samples to be 1, and set real-value tags of other positive sample classes to be 0; and for the negative samples in the training samples, set real-value tags of all positive sample classes to be 0; and an outputting unit configured to make an output layer of the deep neural network output similarities between the training samples and the positive sample classes.

According to a third aspect of the embodiments of this disclosure, there is provided an electronic device, including the recognition apparatus as described in the first aspect or the training apparatus as described in the second aspect.

An advantage of the embodiments of this disclosure exists in that by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
FIG. 1 is a schematic diagram of an existing DNN.
Figure 2:
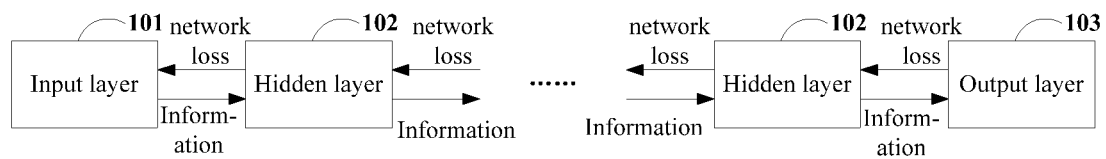
FIG. 2 is a schematic diagram of training a DNN by using an existing method.
Figure 3:
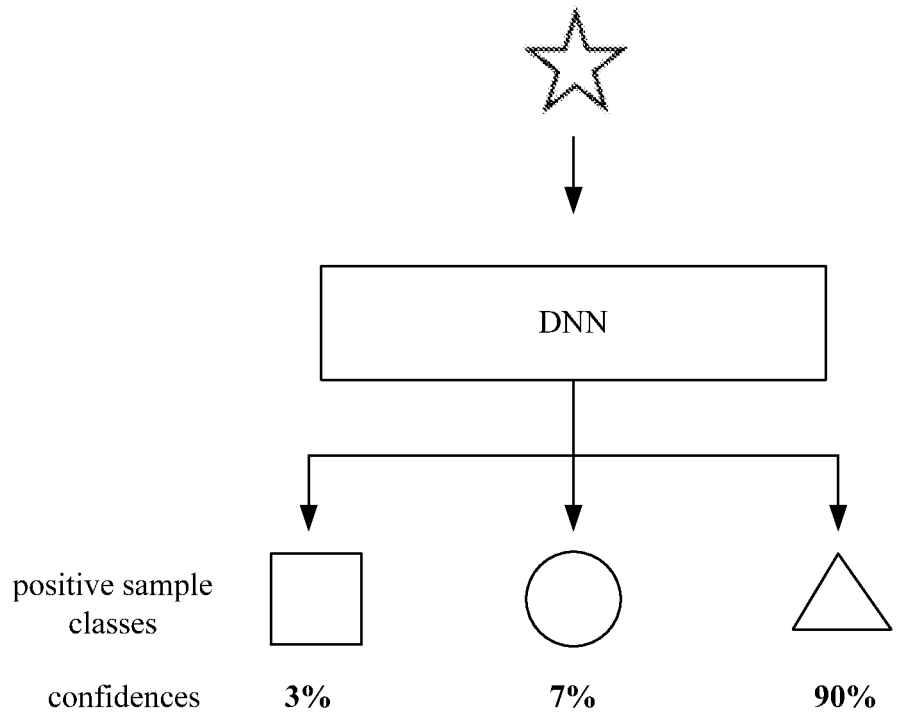
FIG. 3 is a schematic diagram of performing recognition by using a DNN trained by using an existing training method.
Figure 4:
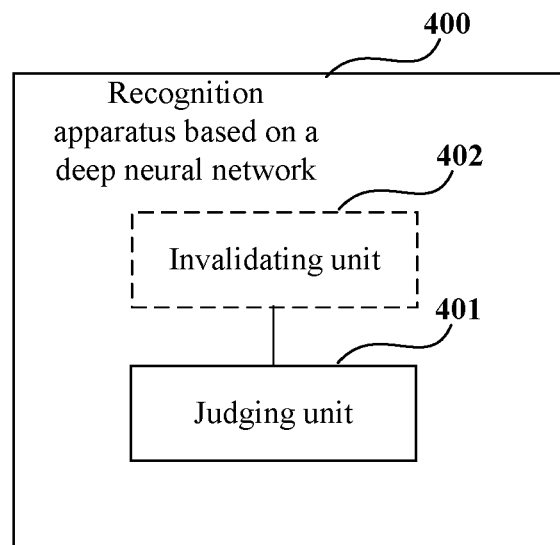
FIG. 4 is a schematic diagram of the recognition apparatus based on a deep neural network of Embodiment 1 of this disclosure.

FIG. 4 is a schematic diagram of the recognition apparatus based on a deep neural network of Embodiment 1 of this disclosure. As shown in FIG. 4, the apparatus 400 includes:

a judging unit or judger 401 configured to judge that a sample to be recognized is a suspected abnormal sample when confidences of positive sample classes in a classification result outputted by an output layer of the deep neural network are all less than a predefined threshold value.

In this embodiment, the deep neural network (DNN) is obtained by inputting training samples including positive samples and negative samples into an input layer of the deep neural network and training.

In this embodiment, the apparatus 400 may include the DNN, and may not include the DNN, but performs judgment by using the outputted classification result of the DNN.

It can be seen from the above embodiment that by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

In this embodiment, the DNN may be any type of existing DNNs. For example, the DNN is an existing convolutional neural network (CNN). And the DNN may include an input layer, several hidden layers and an output layer.

In this embodiment, the classification result outputted by the output layer of the deep neural network includes only the positive sample classes and corresponding confidences of the positive sample classes, but does not include negative sample classes and confidences thereof.

In this embodiment, the abnormal sample refers to a sample not included in the positive sample classes outputted by the output layer of the DNN, that is, the sample is a negative sample. And the sample to be recognized being a suspected abnormal sample means that the sample to be recognized may possibly be an abnormal sample.

In this embodiment, the confidences of the positive sample classes may be expressed by similarities between the sample to be recognized and the positive sample classes, and may also be expressed by a probability that the sample to be recognized belongs to the positive sample classes, and a method of expression of the confidences is not limited in this embodiment.

In this embodiment, when the inputted sample to be recognized is an abnormal sample, a sum of the confidences of the positive sample classes outputted by the output layer of the DNN may not be 1.

Figure 5:
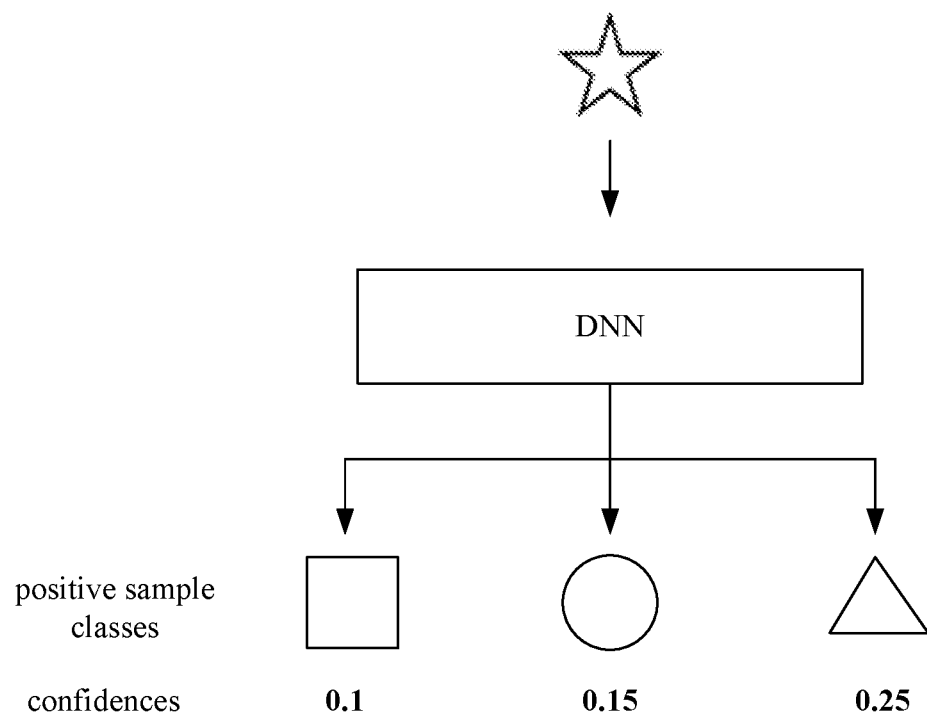
FIG. 5 is a schematic diagram of performing recognition by using the deep neural network of Embodiment 1 of this disclosure.

FIG. 5 is a schematic diagram of performing recognition by using the deep neural network of Embodiment 1 of this disclosure. As shown in FIG. 5, the inputted sample to be recognized is a pentagram sample, that is, the sample to be recognized is an abnormal sample. The confidences of the positive sample classes outputted by the DNN are expressed by similarities between the sample to be recognized and the positive sample classes, and the classification result outputted by the DNN includes 0.1 for a square, 0.15 for a round, and 0.25 for a triangle, respectively.

Figure 6:
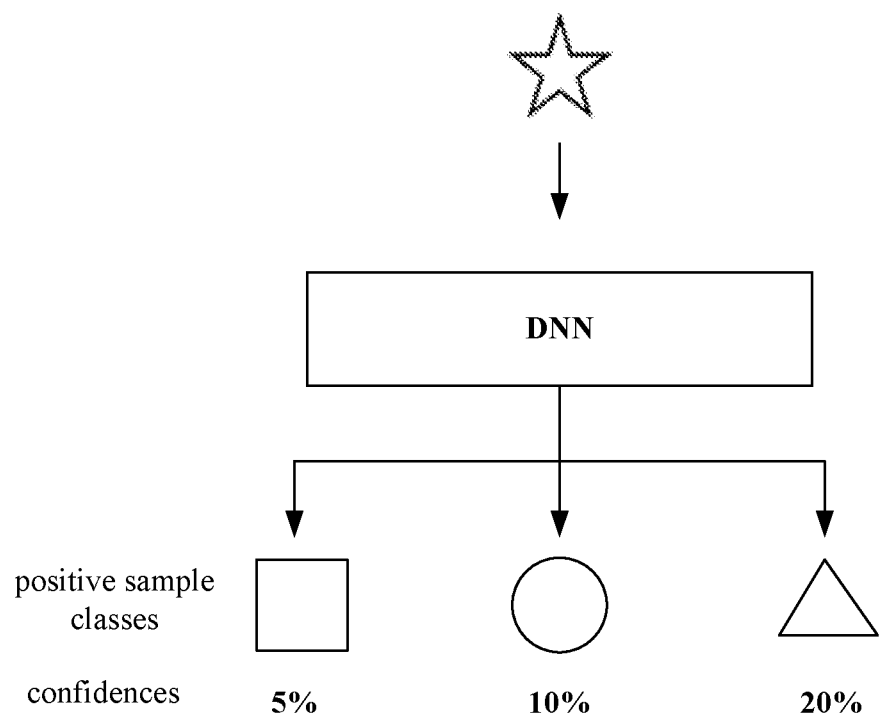
FIG. 6 is another schematic diagram of performing recognition by using the deep neural network of Embodiment 1 of this disclosure.

FIG. 6 is another schematic diagram of performing recognition by using the deep neural network of Embodiment 1 of this disclosure. As shown in FIG. 6, the input sample to be recognized is a pentagram sample, that is, the sample to be recognized is an abnormal sample. The confidences of the positive sample classes outputted by the DNN are expressed by a probability that the sample to be recognized belongs to the positive sample classes, and the classification results outputted by the DNN are 5% for a square, 10% for a round, and 20% for a triangle, respectively.

In this embodiment, the predefined threshold value may be set as actually demanded, for example, the predefined threshold value may be 0.3. Hence, as the confidences of the positive sample classes outputted by the DNN shown in FIG. 5 and FIG. 6 are all less than 0.3, the judging unit 401 judges that the sample to be recognized is an abnormal sample.

In this embodiment, the DNN is obtained by inputting the training samples including positive samples and negative samples into the input layer of the DNN and training. A training apparatus and method for a deep neural network of the embodiment of this disclosure shall be illustrated respectively below in cases where the confidences of the positive sample classes are expressed by similarities between the sample to be recognized and the positive sample classes and the probability that the sample to be recognized belongs to the positive sample classes in the process of recognition.

Figure 7:
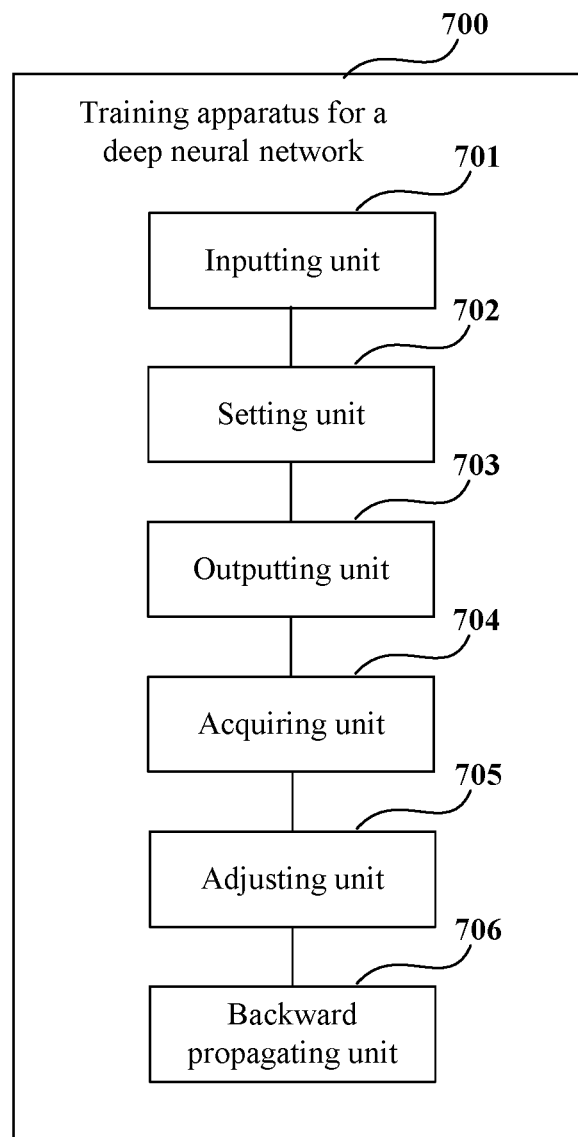
FIG. 7 is a schematic diagram of the training apparatus for a deep neural network of Embodiment 1 of this disclosure.

FIG. 7 is a schematic diagram of the training apparatus for a deep neural network of Embodiment 1 of this disclosure. As shown in FIG. 7, the apparatus 700 includes:
an inputting unit 701 configured to input training samples including positive samples and negative samples into an input layer of the deep neural network;
a setting unit or settor 702 configured to, for the positive samples in the training samples, set real-value tags of positive sample classes of the positive samples to be 1, and set real-value tags of other positive sample classes to be 0; and for the negative samples in the training samples, set real-value tags of all positive sample classes to be 0; and
an outputting unit 703 configured to make an output layer of the deep neural network output similarities between the training samples and the positive sample classes.

In this embodiment, after the training samples are inputted into the DNN, the setting unit 702 sets the real-value tags of the positive sample classes of the DNN.

Figure 8:
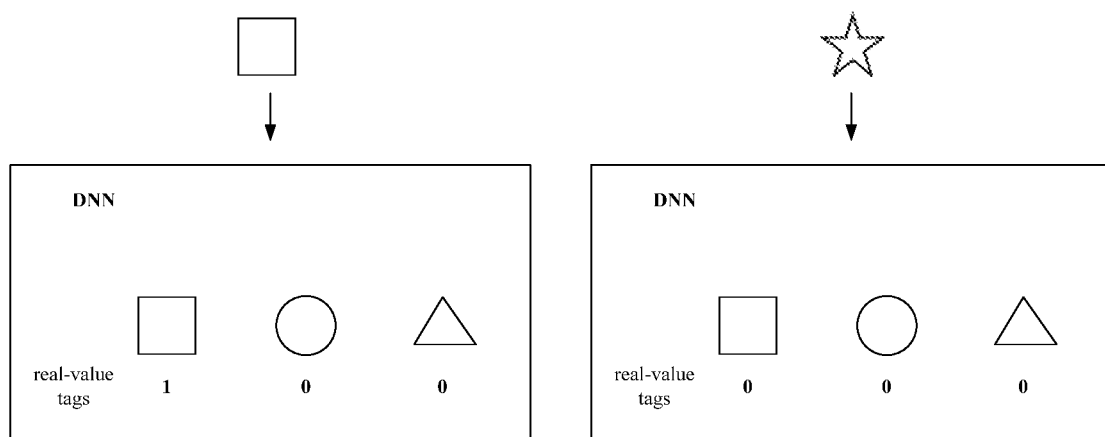
FIG. 8 is a schematic diagram of training the deep neural network of Embodiment 1 of this disclosure.

FIG. 8 is a schematic diagram of training the deep neural network of Embodiment 1 of this disclosure. As shown in FIG. 8, for the square of the positive samples in the training samples, the real-value tag of the positive sample class of the positive sample is set to be 1, and the real-value tags of other positive sample classes are set to be 0; and for the pentagram of the negative samples in the training samples, the real-value tags of all positive sample classes are set to be 0.

Hence, for the negative samples in the training samples, the real-value tags of all positive sample classes are set to be 0, and only the similarities between the training samples and the positive sample classes are outputted. Reliability of the similarities outputted in the recognition may be improved.

In this embodiment, the outputting unit 703 may make the output layer of the deep neural network output similarities between the training samples and the positive sample classes by using an existing method. For example, a sigmoid layer is taken as the output layer, and during the training, initial values of the similarities between the training samples and the positive sample classes outputted by the DNN may be set by using an existing method, such as setting the initial values of the similarities randomly.

In this embodiment, the similarities between the training samples and the positive sample classes may be expressed by, for example, Euclidean distances; however, an expression method of the similarities is not limited in this embodiment.

In this embodiment, the similarities are positive numbers less than 1, and need not be normalized. That is, a sum of the similarities between the training samples and the positive sample classes outputted by the output layer of the DNN may not be 1.

In this embodiment, as shown in FIG. 7, the apparatus 700 may further include:
an acquiring unit or acquirer 704 configured to obtain a network loss according to the similarities between the training samples and the positive sample classes outputted by the output layer of the deep neural network and real values of the training samples obtained according to the real-value tags;
an adjusting unit or adjustor 705 configured to, for the positive samples in the training samples, adjust the network loss according to a predefined weight; and
a backward propagating unit or propagator 706 configured to perform backward propagation of the deep neural network according to the adjusted network loss.

In this embodiment, the real values of the training samples are obtained according to the real-value tags set by the setting unit 702. And a method for obtaining the network loss (also referred to a classification error) by the acquiring unit 704 may be an existing method. For example, a difference between the similarities between the training samples and the positive sample classes outputted by the DNN and the real values of the training samples may be taken as the network loss.

In this embodiment, the adjusting unit 705 may adjust the network loss according to Formula (1) below:

$$l' = \begin{cases} l, & \text{if } s \in \{\text{negative}\} \\ l \times w, & \text{if } s \in \{\text{positive}\} \end{cases} ; \quad (1)$$

where, l' denotes the adjusted network loss, l denotes the network loss before being adjusted, w denotes the predefined weight, s∈{negative} denotes that a current training sample is a negative sample, and s∈{positive} denotes that a current training sample is a positive sample.

In this embodiment, the predefined weight may be set according to an actual situation. For example, when the negative sample is relatively simple, the predefined weight may be set to be a positive number less than 1; and when the negative sample is relatively complex, the predefined weight may be set to be a positive number greater than 1.

Thus, by adjusting the network loss by setting the weight of the positive samples, reliability of the classification result outputted by the DNN may further be improved.

In this embodiment, the backward propagating unit 706 may employ an existing method to perform backward propagation of the deep neural network according to the adjusted network loss.

For example, parameters of each of the output layer, the hidden layers and the input layer of the DNN are corrected, and the above step of adjustment is repeated, until the network loss satisfies a certain convergence condition.

The training apparatus and method for a deep neural network of the embodiment of this disclosure are described above in the case where the confidences of the positive sample classes are expressed by similarities between the sample to be recognized and the positive sample classes in the process of recognition. And the training method for a deep neural network of the embodiment of this disclosure shall be described below in the case where the confidences of the positive sample classes are expressed by the probability that the sample to be recognized belongs to the positive sample classes in the process of recognition.

Figure 9:
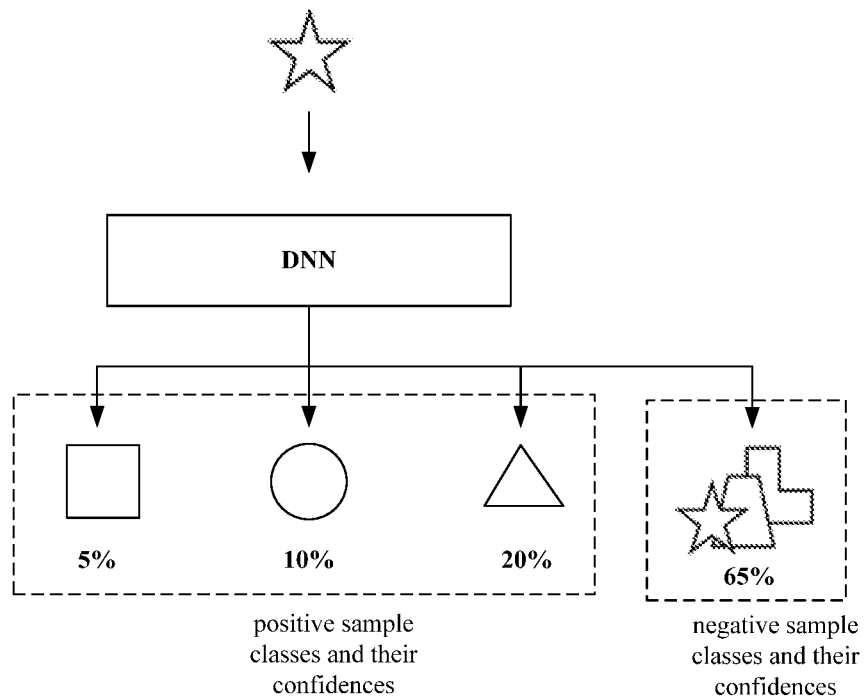
FIG. 9 is another schematic diagram of training the deep neural network of Embodiment 1 of this disclosure.

FIG. 9 is another schematic diagram of training the deep neural network of Embodiment 1 of this disclosure. The output layer of the DNN is, for example, a softmax layer. As shown in FIG. 9, the output classification result includes the positive sample classes and probabilities that the training samples belong to the positive samples, as well as the negative sample classes and probabilities that the training samples belong to the negative sample classes.

In this embodiment, in training the DNN in the case where the confidences of the positive sample classes are expressed by the probability that the sample to be recognized belongs to the positive sample classes in the process of recognition, the adjusting unit 705 may also be used to adjust the network loss, an adjustment method being the same as that described above, and being not going to be described herein any further.

In this embodiment, when the output result of the DNN during training includes the negative sample classes and their confidences, as shown in FIG. 4, the apparatus 400 may further include:

an invalidating unit or invalidator 402 configured to set the negative sample classes and confidences of the negative sample classes to be invalid when the output layer of the deep neural network outputs the classification result.

In this embodiment, the invalidating unit 402 is optional, which is shown by a dotted box in FIG. 4.

Figure 10:
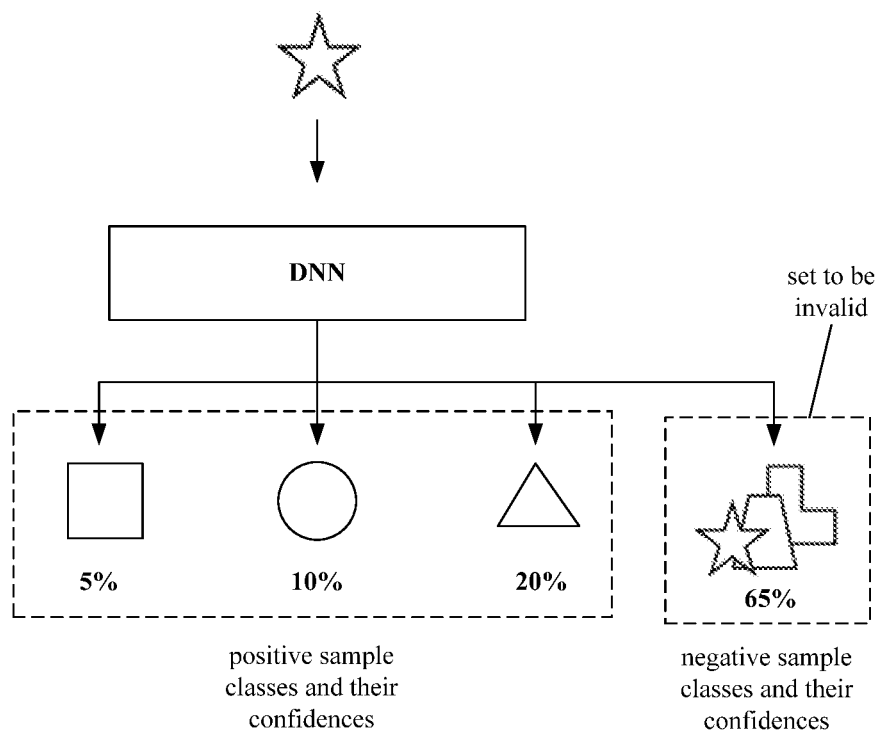
FIG. 10 is a schematic diagram of setting negative sample classes and confidences of the negative sample classes to be invalid of Embodiment 1 of this disclosure.

FIG. 10 is a schematic diagram of setting the negative sample classes and the confidences of the negative sample classes to be invalid of Embodiment 1 of this disclosure. As shown in FIG. 10, the positive sample classes and their probabilities outputted during the recognition are 5% for a square, 10% for a round, and 20% for a triangle, respectively, and a probability of the negative sample classes is 65%. The negative sample classes and their probability are set to be invalid, that is, the negative sample classes and their probability are not outputted. Hence, a sum of the probabilities of the classification results outputted during the recognition is less than 100%.

Hence, as the positive sample classes and their probabilities are outputted only, the reliability of the confidences of the outputted classification result may further be improved.

It can be seen from the above embodiment that by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

Embodiment 2

Figure 11:
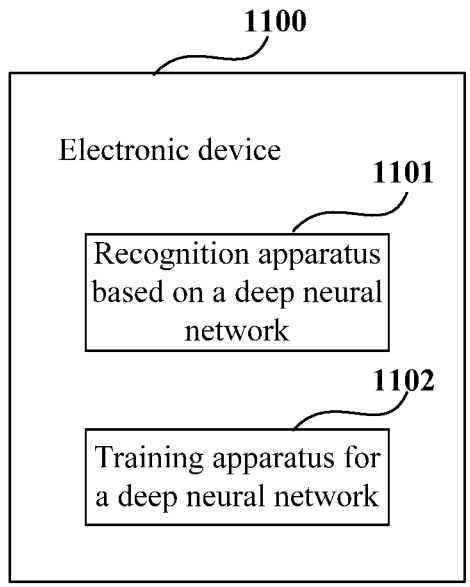
FIG. 11 is a schematic diagram of the electronic device of Embodiment 2 of this disclosure.

An embodiment of this disclosure further provides an electronic device. FIG. 11 is a schematic diagram of the electronic device of Embodiment 2 of this disclosure. As shown in FIG. 11, the electronic device 1100 includes a recognition apparatus 1101 based on a deep neural network or a training apparatus 1102 for a deep neural network. In this embodiment, structures and functions of the recognition apparatus 1101 and the training apparatus 1102 are the same as those contained in Embodiment 1, and shall not be described herein any further.

Figure 12:
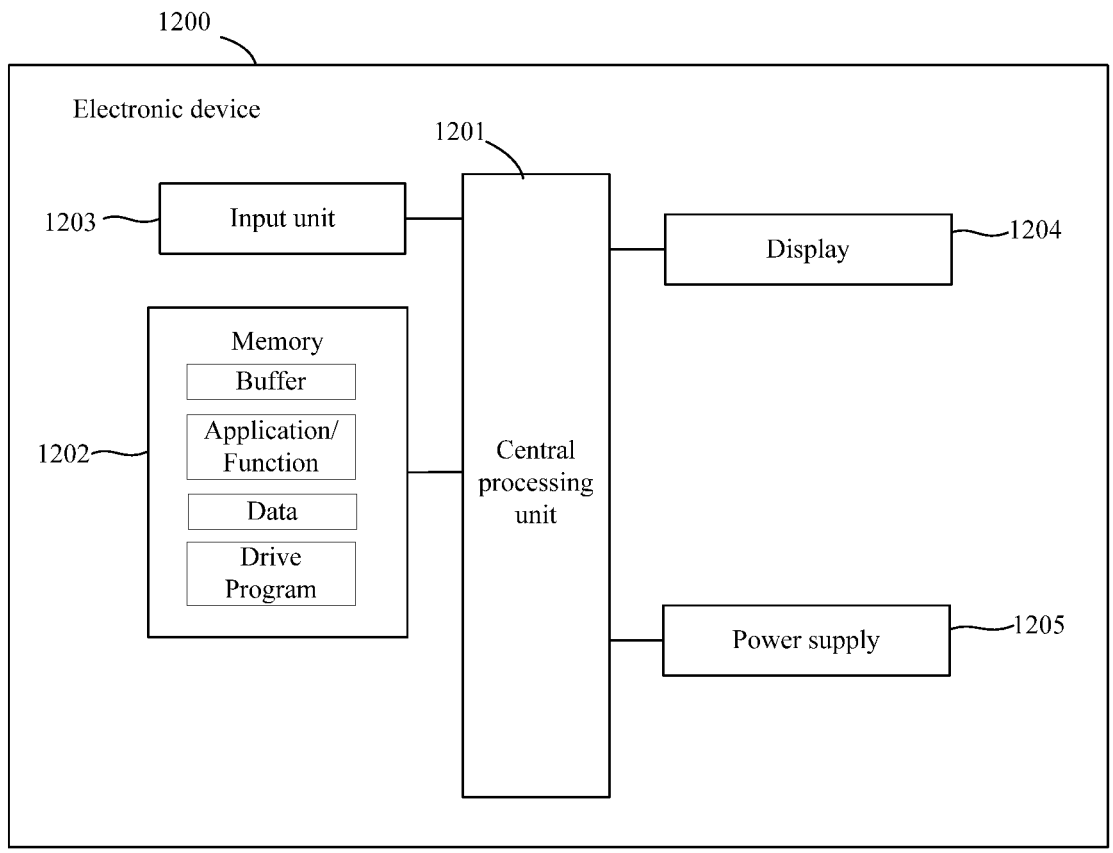
FIG. 12 is a block diagram of a systematic structure of the electronic device of Embodiment 2 of this disclosure.

FIG. 12 is a block diagram of a systematic structure of the electronic device of Embodiment 2 of this disclosure. As shown in FIG. 12, the electronic device 1200 may be a computer and include a central processing unit 1201 and a memory 1202, the memory 1202 being coupled to the central processing unit 1201. This figure is illustrative only, and other types of structures may also be used, to supplement or replace this structure and achieve a telecommunications function or other functions.

As shown in FIG. 12, the electronic device 1200 may further include an input unit 1203, a display 1204, and a power supply 1205.

In an implementation, the functions of the recognition apparatus based on a deep neural network described in Embodiment 1 may be integrated into the central processing unit 1201. In this embodiment, the central processing unit 1201 may be configured to: judge that a sample to be recognized is a suspected abnormal sample when confidences of positive sample classes in a classification result outputted by an output layer of the deep neural network are all less than a predefined threshold value.

In this embodiment, the confidences of positive sample classes refer to similarities between the sample to be recognized and the positive sample classes.

In this embodiment, the central processing unit 1201 may further be configured to: set negative sample classes and confidences of the negative sample classes to be invalid when the output layer of the deep neural network outputs the classification result.

In another implementation, the functions of the training apparatus for a deep neural network described in Embodiment 1 may be integrated into the central processing unit 1201.

In this embodiment, the central processing unit 1201 may be configured to: input training samples including positive samples and negative samples into an input layer of the deep neural network; for the positive samples in the training samples, set real-value tags of positive sample classes of the positive samples to be 1, and set real-value tags of other positive sample classes to be 0; and for the negative samples in the training samples, set real-value tags of all positive sample classes to be 0; and make an output layer of the deep neural network output similarities between the training samples and the positive sample classes.

In this embodiment, the central processing unit 1201 may further be configured to: obtain a network loss according to the similarities between the training samples and the positive sample classes outputted by the output layer of the deep neural network and real values of the training samples obtained according to the real-value tags; for the positive samples in the training samples, adjust the network loss according to a predefined weight; and perform backward propagation of the deep neural network according to the adjusted network loss.

In this embodiment, the electronic device 1200 does not necessarily include all the parts shown in FIG. 12.

As shown in FIG. 12, the central processing unit 1201 is sometimes referred to as a controller or control, and may include a microprocessor or other processor devices and/or logic devices. The central processing unit 1201 receives input and controls operations of every components of the electronic device 1200.

In this embodiment, the memory 1202 may be, for example, one or more of a buffer memory, a flash memory, a hard drive, a mobile medium, a volatile memory, a nonvolatile memory, or other suitable devices, which may store the above planned network information and deployed network information, and may further store a program executing related information. And the central processing unit 1201 may execute the program stored in the memory 1202, to realize information storage or processing, etc. Functions of other parts are similar to those of the relevant art, which shall not be described herein any further. The parts of the electronic device 1200 may be realized by specific hardware, firmware, software, or any combination thereof, without departing from the scope of the present disclosure.

It can be seen from the above embodiment that by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

Embodiment 3

Figure 13:
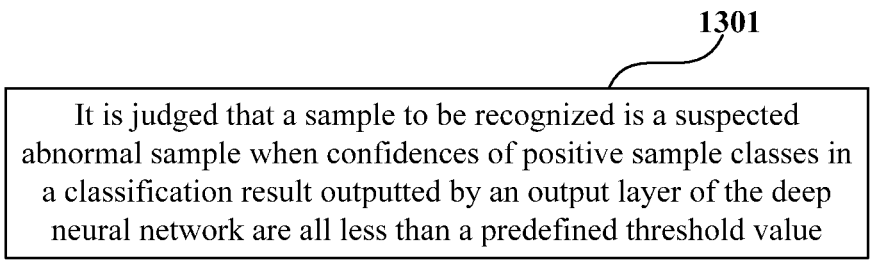
FIG. 13 is a flowchart of the recognition method based on a deep neural network of Embodiment 3 of this disclosure.

An embodiment of this disclosure further provides a recognition method based on a deep neural network, which corresponds to the recognition apparatus based on a deep neural network described in Embodiment 1. FIG. 13 is a flowchart of the recognition method based on a deep neural network of Embodiment 3 of this disclosure. As shown in FIG. 13, the method includes:

Step 1301: it is judged that a sample to be recognized is a suspected abnormal sample when confidences of positive sample classes in a classification result outputted by an output layer of the deep neural network are all less than a predefined threshold value.

Figure 14:
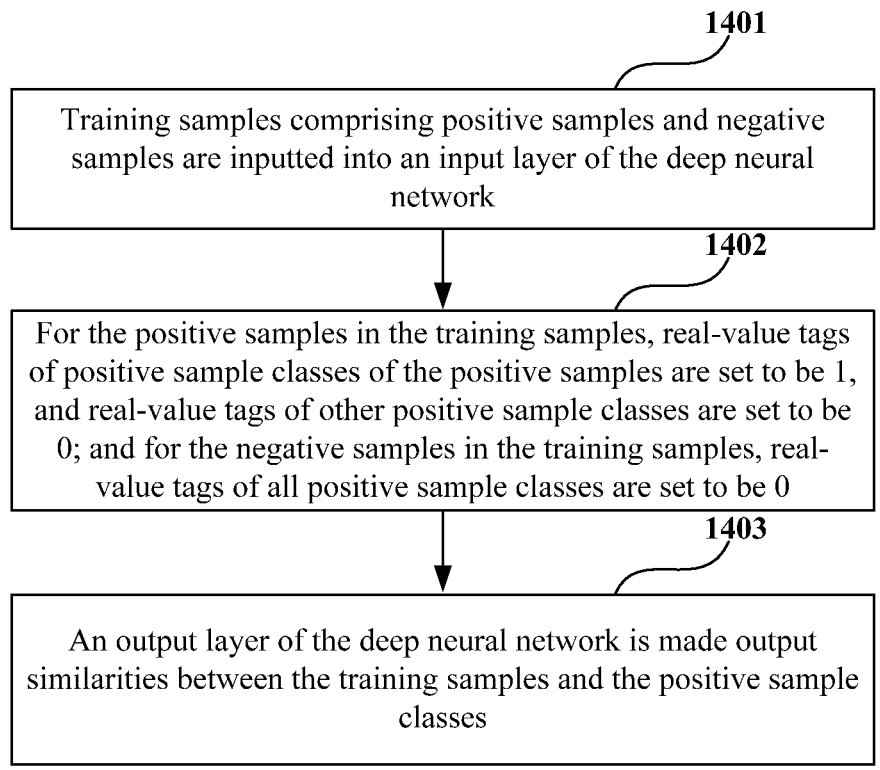
FIG. 14 is a flowchart of the training method for a deep neural network of Embodiment 3 of this disclosure.

FIG. 14 is a flowchart of the training method for a deep neural network of Embodiment 3 of this disclosure. As shown in FIG. 14, the method includes:

Step 1401: training samples comprising positive samples and negative samples are inputted into an input layer of the deep neural network;

Step 1402: for the positive samples in the training samples, real-value tags of positive sample classes of the positive samples are set to be 1, and real-value tags of other positive sample classes are set to be 0; and for the negative samples in the training samples, real-value tags of all positive sample classes are set to be 0; and Step 1403: an output layer of the deep neural network is made output similarities between the training samples and the positive sample classes.

In this embodiment, a method for judging the sample to be recognized, a method for setting the real-value tags and a method for outputting the similarities are the same as those contained in Embodiment 1, and shall not be described herein any further.

It can be seen from the above embodiment that by inputting training samples including positive samples and negative samples into an input layer of the deep neural network and training and judging that a sample to be recognized is a suspected abnormal sample when confidences of outputted positive sample classes are all less than a predefined threshold value, reliability of a confidence of a classification result outputted by the deep neural network may be efficiently improved.

An embodiment of the present disclosure provides a computer readable program code, which, when executed in a recognition apparatus based on a deep neural network, a training apparatus for a deep neural network, or an electronic device, will cause a computer unit to carry out the recognition method or the training method described in Embodiment 3 in the recognition apparatus based on a deep neural network, the training apparatus for a deep neural network, or the electronic device.

An embodiment of the present disclosure provides a computer readable medium, including a computer readable program code, which will cause a computer unit to carry out the recognition method or the training method described in Embodiment 3 in a recognition apparatus based on a deep neural network, a training apparatus for a deep neural network, or an electronic device.

The recognition method or the training method described with reference to the embodiments of this disclosure carried out in the recognition apparatus based on a deep neural network, the training apparatus for a deep neural network, or the electronic device, may be directly embodied as hardware, software modules executed by a processor, or a combination thereof. For example, one or more functional block diagrams and/or one or more combinations of the functional block diagrams shown in FIG. 4 and FIG. 7 may either correspond to software modules of procedures of a computer program, or correspond to hardware modules. Such software modules may respectively correspond to the steps shown in FIG. 13 and FIG. 14. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art, such as a non-transitory computer readable storage. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 4 and FIG. 7 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in FIG. 4 and FIG. 7 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A training apparatus for a deep neural network, comprising:
    a memory that stores a plurality of instructions; and
    a processor coupled to the memory and configured to execute a process corresponding to the plurality of instructions, the process including:
        inputting training samples, including positive samples and negative samples, into an input layer of the deep neural network;
        setting, for the positive samples in the training samples, first real-value tags of first positive sample classes of the positive samples to be 1, and second real-value tags of second positive sample classes to be 0;
        setting, for the negative samples in the training samples, third real-value tags of all positive sample classes to be 0;
        making an output layer of the deep neural network output similarities between the training samples and the positive sample classes;
        obtaining a network loss according to the similarities between the training samples and the positive sample classes outputted by the output layer of the deep neural network and real values of the training samples obtained according to the first, second and third real-value tags;
        obtaining, for the positive samples in the training samples, an adjusted network loss according to:

$$l' = \begin{cases} l, \text{ if } s \in \{\text{negative}\} \\ l \times w, \text{ if } s \in \{\text{positive}\} \end{cases},$$

where l' denotes the adjusted network loss, l denotes the network loss without adjustment, w is a positive number less than 1 that denotes a predefined weight, s∈{negative} denotes that a current training sample is a negative sample, and s∈{positive} denotes that a current training sample is a positive sample, and
    performing backward propagation of the deep neural network according to the adjusted network loss.

2. An electronic device, comprising the training apparatus as claimed in claim 1.

* * * * *